Dec. 23, 1969  D. D. RAHRIG ET AL  3,485,615
GLASS SHEET SUPPORTING AND CONVEYING APPARATUS WITH
MEANS TO CHANGE THE CONTOUR OF THE CONVEYOR
Filed March 24, 1967  2 Sheets-Sheet 1

INVENTORS
Donald D. Rahrig,
George F. Ritter, Jr. and
BY Frank J. Carson

Nobbe & Collins
ATTORNEYS

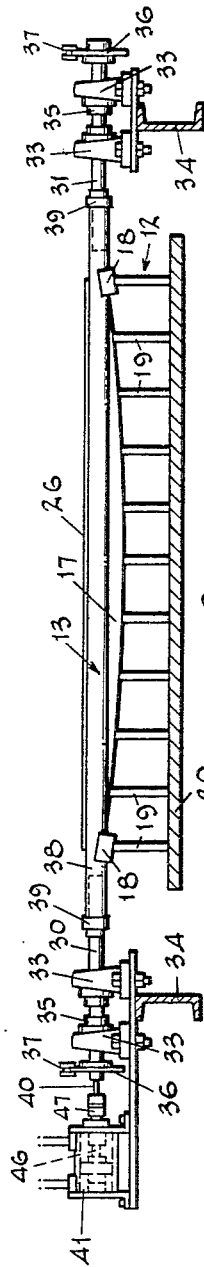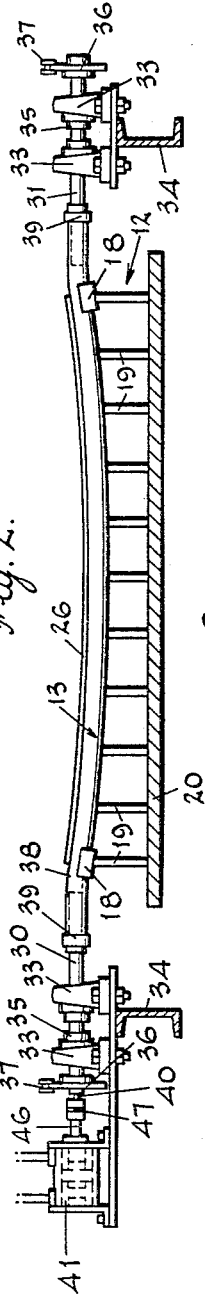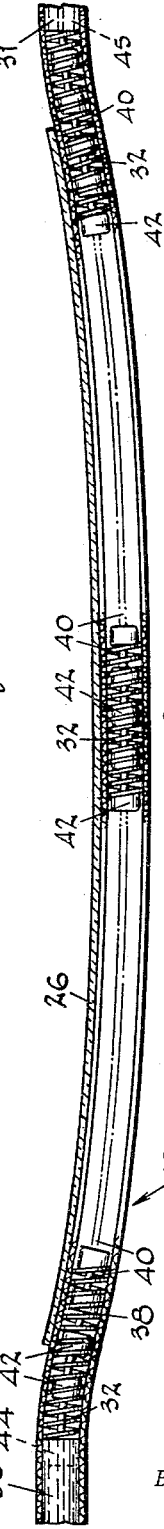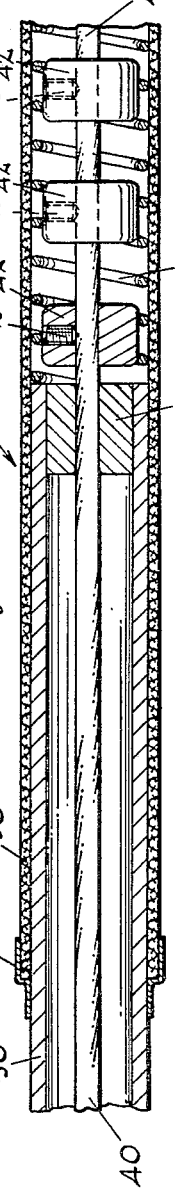

United States Patent Office 3,485,615
Patented Dec. 23, 1969

3,485,615
GLASS SHEET SUPPORTING AND CONVEYING APPARATUS WITH MEANS TO CHANGE THE CONTOUR OF THE CONVEYOR
Donald D. Rahrig, George F. Ritter, Jr., and Frank J. Carson, Toledo, Ohio, assignors to Libbey-Owens-Ford Glass Company, Toledo, Ohio, a corporation of Ohio
Filed Mar. 24, 1967, Ser. No. 625,872
Int. Cl. C03b 13/18
U.S. Cl. 65—181                                        11 Claims

ABSTRACT OF THE DISCLOSURE

Sheet supporting and conveying apparatus comprising a plurality of conveyor rolls, each including a flexible center section which permits the roll to conform to the surface contour of the sheets carried by it. A tensioning device is provided to vary the flexibility of the center section thereby making it possible to support flat sheet or sheets of differing surface contours. The tensioning device is responsive to and controlled by movement of the sheets onto the conveyor rolls.

---

The present invention relates generally to supporting and conveying apparatus and more particularly to improved rotary apparatus of this character for movably supporting both flat and bent sheets.

To date the invention has proved of particular utility in handling heat-softened glass sheets within a horizontal type bending apparatus and will be so described herein by way of example.

In the manufacture of curved glass sheets in large quantities, such as is encountered in the commercial production of glazing closures for automobiles or the like, it is customary to convey the sheets successively through a heating area, a bending area and an annealing or chilling area, in a substantially continuous manner by means of externally driven roll-type conveyors. During a substantial portion of the bending process, the glass is in a heat-softened state in which it is extremely vulnerable to distortion and surface marring. The problem is particularly acute within the bending apparatus since at different times in the bending cycle the glass sheets rest upon the same rolls both in a flat condition and in a bent condition. Unless adequate support is provided under both conditions, distortion and marring are likely to occur as well as a tendency for the bent glass to relax from its bent condition.

It is therefore an important object of the present invention to provide an improved roll-type conveyor for supporting both flat and bent glass sheets while in a heat softened condition.

Another object of the invention is to provide such a flexible roll comprising a center section which is adjustable to conform to the plane or curved contour of the sheet placed upon it by applying a predetermined tensile force to said center section.

Another object of the invention is to provide such a roll conveyor in which the individual rolls are flexible and the flexibility is automatically controlled by movement of the sheets on the conveyor.

A further object of the invention is to provide means for adjusting the tensile force applied to the center section of the conveyor roll while the conveyor is in operation as an integral part of the bending apparatus control system.

Other objects and advantages of the invention will become more apparent during the course of the following description when taken in connection with the accompanying drawings.

In the drawings wherein like numerals are employed to designate like parts throughout the same:

FIG. 2 is a partial cross-sectional view taken along the line 2—2 of FIG. 1 depicting a flat glass sheet on a conveyor roll before commencement of the bending operation;

FIG. 3 is a partial cross-sectional view similar to FIG. 2 but depicting the supported relation of the bent glass sheet and conveyor rolls after completion of the bending operation;

FIG. 4 is an enlarged fragmentary, longitudinal section of the central portion of a conveyor roll of the invention carrying a glass sheet under conditions as illustrated in FIG. 3;

FIG. 5 is an enlarged fragmentary, longitudinal sectional view of an end portion of a conveyor roll illustrating the structural details thereof.

Figure 1:
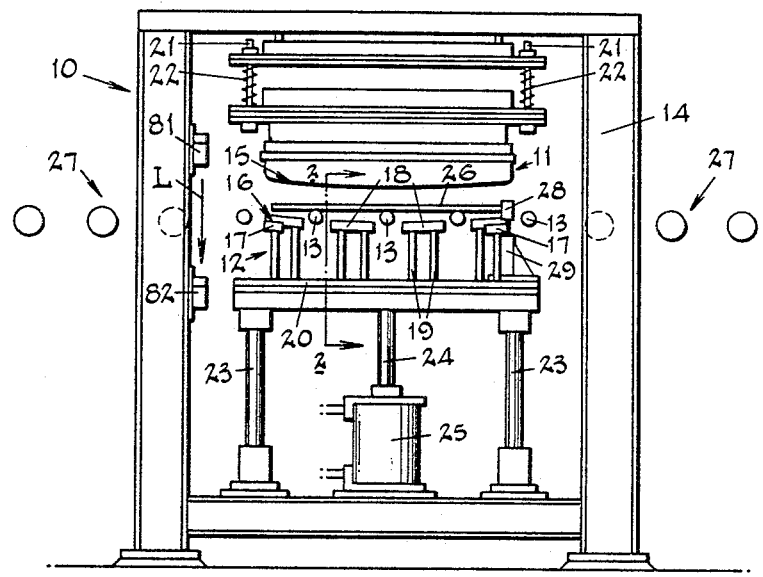
FIG. 1 is a side elevation of a horizontal press-bending apparatus showing a flat glass sheet to be bent supported upon conveyor rolls incorporating the present invention.

Referring now more particularly to the drawings, the novel features of the present invention have been depicted as incorporated in a type of glass bending apparatus used in "press-bending" glass sheets; however, it will be apparent that the invention will have utility in any horizontal conveyor application wherein it is desired to accommodate articles that may be either flat or of varying curvature.

The press bending apparatus indicated generally by the numeral 10 consists mainly of a substantially stationary upper male mold member 11, a movable lower female mold member 12 and a series of supporting conveyor rolls 13, all suitably mounted within a rigid framework 14. The shaping element 15 of the upper mold member 11 is generally a continuous surface, while the complemental shaping element 16 of the lower mold member 12 is of ring-type outline which engages only the marginal edge portions of the glass sheet. In order to provide clearance for the conveyor rolls and to permit the lower mold member 12 to move vertically into and out of pressing relation with the upper mold member 11, the ring-type shaping element 16 is constructed of transversely disposed segments 17 and longitudinally disposed spaced bar segments 18, supported on pillars 19 fixed to a base section 20. The upper mold member 11 is supported on the framework 14 by bolts 21 and resiliently spaced therefrom by springs 22 which surround the bolts and act as cushions to absorb excessive pressure from being otherwise exerted on the glass sheet by the action of lower mold member 12.

The lower mold member 12 is supported by guide members 23 which allow vertical movement only; said vertical movement being provided by the ram 24 of an air cylinder 25, which bears against the base of the lower mold member.

Glass sheets 26 are transferred into and away from the bending apparatus by a roll-type conveyor system 27 and received on the rolls 13 in the bending area. Each sheet is halted between the mold members by engagement of its leading edge with locator stops 28 (one of two shown) which are moved by associated air cylinders 29 into and out of the path of sheet movement.

In the illustrated embodiment of the invention, each conveyor roll 13 comprises end sections or tubular stub shafts 30 and 31 and a center section formed by a flexible coil spring 32 that is secured at its ends, as by welding, to the opposed inner ends of the stub shafts. The stub shafts 30 and 31 are journaled in associated pairs of aligned bearings 33 mounted on structural rails 34 located along either side of the bending apparatus 10.

Each stub shaft is equipped with a lock collar 35 between the respective pair of bearings to prevent undesired endwise movement, and outwardly of the bearings is provided with a sprocket 36. The sprockets, on each side of the bending apparatus, are driven by chain belts 37 that are operated in tandem from a suitable source of power.

The component sections of the conveyor roll, namely the stub shafts 30 and 31 and coil spring 32, are covered by a sleeve of woven asbestos or fiber glass cloth 38 which provides a soft, non-abrasive, resilient glass supporting surface. The sleeve is stretched on the roll sections and fastened at its ends to the stub shafts with pressure sensitive tape 39 or in some other convenient manner.

As herein provided, the coil spring 32 is secured at its opposite ends to the inner ends of the stub shafts 30 and 31 and forms therewith a flexible conveyor roll on which flat heat-softened glass sheets can be supported and conveyed into position between the upper and lower bending members, and after bending transferred therefrom.

The coil spring 32 is caused to assume an axially aligned continuity throughout its length or a curved continuity complementary to the curvature of the bent sheet, by means of a flexible cable 40 which is passed through the spring and secured at one end to the inner end of one stub shaft 31 while the other end is extended through the opposite stub shaft 30 and connected to the ram of a double-acting cylinder 41. To maintain the cable 40 at all times in concentric relation with the coil spring, the cable is provided with a plurality of spaced cylindrical discs 42 that are fixed to the cable by securing means such as set-screws 43. The discs are of such diameter that they can slide freely relative to the coils of the spring and yet afford a satisfactory articulated support therefore.

Specifically, the inner ends of the tubular stub shafts 30 and 31 are fitted with fixed bushings 44 and 45 and one end of the cable 40 is secured as by welding to the bushing 45. At its other end, the cable passes through the bushing 44 and is attached to the ram 46 of the cylinder 41 by a swivel coupling 47 to produce endwise tensioning or relaxation of the cable throughout its length while simultaneously permitting rotation thereof.

When a flat glass sheet is received on the conveyor rolls 13, the ram 46 associated with each roll will be retracted to a position inwardly of the cylinder 41 to render the cable 40 taut so that the discs 42 will support the coil spring 32 in axial alignment with the stub shafts 30 and 31. This will maintain the flexible sleeve 38 in a horizontal position as in FIG. 2 to receive a flat sheet of glass 26. During the actual bending operation, when the sheet is removed from the rolls, the rams 46 are moved outwardly, due to the direction of pressure to the head end of the cylinders 41, as will be hereinafter more fully described, to relax the cable 40 throughout its length and allow the discs 42 to accommodate the coil spring 40 as it assumes a contour corresponding to the curvature of the bent sheet. As herein contemplated, the outward length of stroke of the ram 46 can be adjusted to control the degree of flexibility developed in the cable as it is relaxed from the taut condition thereof.

Figure 6:
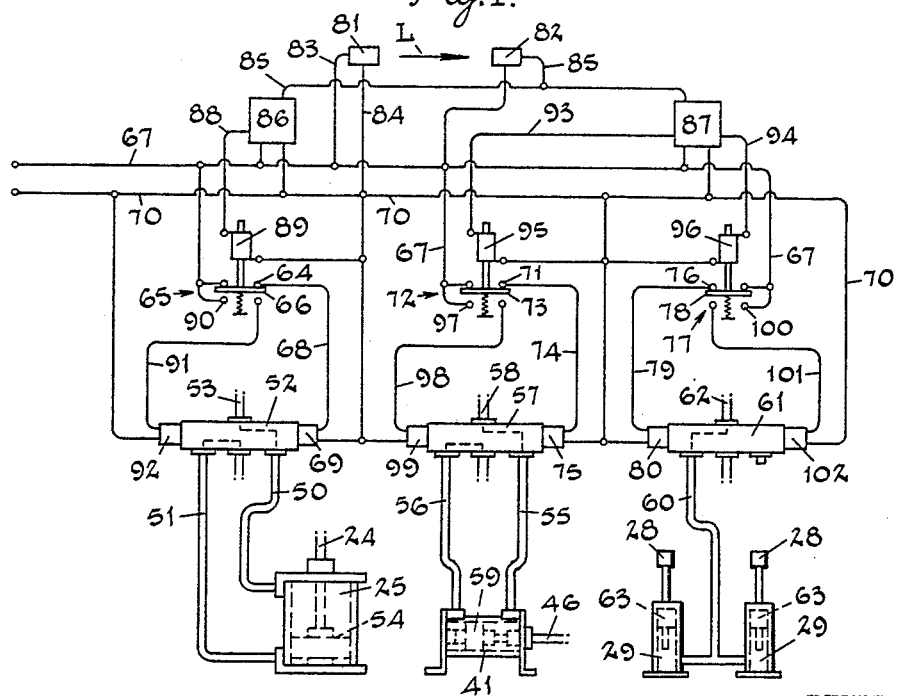
FIG. 6 is a partial schematic diagram of the bending apparatus control system.

Referring now to the electrical control system for the bending apparatus 10 shown in FIG. 6, the actuating cylinder 25 for raising and lowering the lower bending member 12 is connected by conduits 50 and 51 to a four-way valve 52, with the pipe 50 being connected to a pressure supply pipe 53 to direct pressure to said cylinder above the piston 54 to maintain the lower bending member in its down position. Cylinder 41 is connected by conduits 55 and 56 to a four-way valve 57, with pipe 55 being connected to a pressure supply pipe 58 to direct pressure to cylinder 41 to retract the piston 59 and maintain the cable 40 taut. Likewise, the cylinders 29 are connected in common by conduit 60 to a valve 61, with conduit 60 being in communication with a pressure supply pipe 62 to direct pressure beneath the pistons 63 thereby supporting the locator stops 28 above the conveyor rolls 13 and in the path of the glass sheet entering the bending apparatus.

As also illustrated, the contacts 64 of a spring-biased relay switch RS 65 are engaged by armature bar 66 to complete a circuit from source line 67 by line 68 through end 69 of the valve 52 to opposite source line 70. Similarly, the contacts 71 of spring-biased relay switch RS 72 are engaged by armature bar 73 to complete a circuit from source line 67 by line 74 through the end 75 of valve 57 to opposite source line 70. The contacts 76 of spring-biased relay switch RS 77 are engaged by armature bar 78 to complete a circuit from source line 67 by line 79 through the end 80 of valve 61 to opposite source line 70.

In operation, entry of a glass sheet 26 into the bending apparatus interrupts the beam designated L from a photoelectric cell 81, in circuit with source lines 67 and 70 through lines 83 and 84 to the receiver 82. The receiver unit 82 is thereby caused to complete a circuit from source lines 67 by line 85 to timing relays TR 86 and 87; each being in series with source lines 67 and 70. TR 86 determines the timed interval during which the lower mold member 12 is moved upwardly to lift the glass sheet from rolls 13 into pressing contact with the upper mold member 11 and to then move the mold member 12 downwardly. To this end, TR 86 establishes a circuit by line 88 through the solenoid 89 of RS 65 to source line 70, thereby moving bar 66 into engagement with contacts 90 to close a circuit by line 91 from source line 67 through end 92 of valve 52 to source line 70. This action places pressure pipe 53 in connection with conduit 51 to introduce pressure into the cylinder 25 beneath piston 54. When TR 86 times out, the opening of line 88 permits the bar to be returned to engagement with contacts 64 whereupon restoration of line circuit 68 through valve end 69 will again connect pipes 50 and 53 to lower the piston 54, and consequently mold member 12.

When pressure is directed ahead of the piston 59 of each cylinder 41 as previously described, the ram 46 will be positioned to maintain the associated cable 40 in the tensioned or taut condition to support the heat-softened, flat glass sheet as it is received on each of the several conveyor rolls 13 and carried into engagement with the locator stops 28. TR 87 is therefore adjusted to initiate a first time interval during which the sheet is raised by the lower mold member and a second interval during which the bent sheet is lowered onto the conveyor rolls and moved outwardly from the bending apparatus. Thus, after the sheet is lifted from the conveyor rolls, TR 87 completes a circuit by lines 93 and 94 through the solenoids 95 and 96 of RS 72 and 77, respectively, to source line 70. In the first instance, the armature bar 73 will be moved into engagement with contacts 97 to make a circuit by line 98 through the end 99 of valve 57. This will cause pressure to be directed from pipe 58 through pipe 56 to cylinder 41 behind the piston 59. Extension of the ram 46 relaxes the tension of attached cable 40 to permit the central section of the respective roll 13 to conform to the curvature of the bent sheet when it it lowered thereupon.

Substantially simultaneously, line 94 energizes solenoid 96 of RS 77 to move armature bar 78 into engagement with contacts 100 whereupon a circuit will be made by line 101 through end 102 of valve 61. This will operate to break the connection of pressure pipe 62 to conduit 60 thereby lowering the locator stops 28 below the conveyor rolls as the pressure beneath the pistons 63 is relieved.

During the second timing function, TR 87 is adjusted to determine the interval of time during which the bent sheet is received on the relaxed central sections of the conveyor rolls 13 and is carried from between the mold members. Then opening of the circuits by lines 93 and 94 causes the bar 73 of RS 72 to re-engage contacts 71 and bar 78 of RS 77 to re-engage contacts 76. The completion of line circuit 74 reverses valve 57 to again direct pressure through conduit 55 to move the ram 46 inwardly and again place the cable 40 in tension. The completion of line circuit 79 produces elevation of the locator stops 28 as pressure is directed beneath the pistons 63 through conduit 60. Consequently, the conveyor rolls are again put in tension to receive and support a flat glass sheet while the locator stops are raised into position to engage its leading edge as a sheet reaches the desired location between the upper and lower mold members.

It is to be understood that the forms of the invention herewith shown and described are to be taken as illustrative embodiments only of the same and that various changes in the shape, size and arrangement of parts may be resorted to without departing from the spirit of the invention.

We claim:

1. In apparatus for the horizontal bending of glass sheets, a bending mold having an upper bending member and a ring-type lower bending member spaced therefrom, a plurality of conveyor rolls mounted for rotation within said ring-type lower bending member for supporting said glass sheet between said spaced bending members, and means for moving said lower bending member upwardly to lift said glass sheet from said conveyor rolls and bend the same against said upper bending member and downwardly to return the bent sheet to said bending position; the improvement which consists in that each of said conveyor rolls comprises a pair of stub shafts spaced in end-to-end relation, a flexible member bridging the space between said stub shafts and having a diameter substantially equal to the diameters of said stub shafts, a second flexible member arranged concentrically within the first-named flexible member, said second-named flexible member being fixed at one end to one of the stub shafts and the other end extending through the other stub shaft, and means for applying a tensile force to said extended end of the second-named flexible member to vary the flexibility of said first-named flexible member.

2. The improvement according to claim 1, including a covering of a soft-non-abrasive, resilient material for said first-named flexible member.

3. The improvement according to claim 1, including means responsive to movement of the glass sheet into the bending mold for initiating the operation of said means for applying tensile force to the second-named flexible member to vary the flexibility of said first-named flexible member.

4. Sheet supporting and conveying apparatus, comprising a plurality of conveyor rolls mounted for rotary movement, each roll comprising a pair of stub shafts spaced in end-to-end relation, a flexible member bridging the space between said stub shafts and having a diameter substantially equal to the diameters of said stub shafts, a second flexible member arranged concentrically within the first-named flexible member, said second-named flexible member being fixed at one end to one of the stub shafts and the other end extending through the other stub shaft, and means for applying a tensile force to said extended end of the second-named flexible member to vary the flexibility of said first-named flexible member.

5. Sheet supporting and conveying apparatus as defined in claim 4, including a covering of a soft, non-abrasive resilient material for said first-named flexible member.

6. Sheet supporting and conveying apparatus as defined in claim 4, including means responsive to movement of the glass sheet into the bending mold for initiating the operation of said means for applying tensile force to said second-named flexible member to vary the flexibility of said first-named flexible member.

7. Sheet supporting and conveying apparatus comprising a plurality of conveyor rolls mounted for rotary movement, each roll comprising a pair of stub shafts spaced in end-to-end relation, a centrally disposed flexible member bridging the space between the stub shafts and fixed to the opposed inner ends thereof, a second flexible member located within the first-named flexible member, means supporting the second-named flexible member in concentric relation to said first-named flexible member, said second-named flexible member being fixed at one end to one of said stub shafts and extending outwardly through the other of said stub shafts, reciprocally operable means to which the extended end of the second-named flexible member is connected, and means for actuating said reciprocally operable means to alternatively apply a tensile force to said second-named flexible member and to adjustably relax said tensile force.

8. Sheet supporting and conveying apparatus as defined in claim 7, in which the first-named flexible member comprises a coil spring having an outer diameter substantially equal to that of the spaced stub shafts, the second-named flexible member comprises a wire cable, and the support means for said second-named-flexible member includes a plurality of annular discs fixed on said wire cable and slidably interfitting with the inner diameter of said coil spring.

9. Sheet supporting and conveying apparatus as defined in claim 8, in which said reciprocally operable means comprises a cylinder including a reciprocal ram, a swivel coupling secured to the outer end of the ram and to which the extended end of the wire cable is connected, pressure means connected to the respective ends of the cylinder, and control means for said pressure means to cause inward movement of said ram to thereby apply a tensile force on said wire cable and outward movement of said ram to relax said tensile force.

10. Sheet supporting and conveying apparatus as defined in claim 9, including means responsive to movement of the glass sheet into the bending mold to initiate operation of said control means.

11. Sheet supporting and conveying apparatus as defined in claim 9, in which said control means includes a timing unit functionally operable to initiate a first operation of the control means to tension the cable and effect axial alignment of the coil spring with said stub shafts to support a sheet of one surface contour and a second operation of the control means to relax said cable to permit said coil spring to conform to a sheet of a differing surface contour.

References Cited

UNITED STATES PATENTS 2,223,124 11/1940 Owen _____ 65—273 X
2,348,887 5/1944 Drake _____ 65—273 X ARTHUR D. KELLOGG, Primary Examiner U.S. Cl. X.R.

29—125, 126, 127; 65—273, 275, 289; 198—127